United States Patent [19]

Dowzall et al.

[11] Patent Number: 4,731,149

[45] Date of Patent: Mar. 15, 1988

[54] APPARATUS FOR USE IN SPACING LETTERS

[75] Inventors: Martin E. Dowzall, Wyckoff; Vazgen J. Houssian, Union City, both of N.J.

[73] Assignee: Esselte Pendaflex Corporation, Garden City, N.Y.

[21] Appl. No.: 784,220

[22] Filed: Oct. 4, 1985

[30] Foreign Application Priority Data

Oct. 5, 1984 [GB] United Kingdom ................. 8425200

[51] Int. Cl.[4] ......................... B44C 1/16; B32B 31/00; G01B 3/22

[52] U.S. Cl. .................................... 156/541; 156/240; 156/562; 156/DIG. 27; 33/172 R; 33/569

[58] Field of Search .................. 33/184.5, 169 C, 568, 33/569, 434, 446, 454, 447, 467, 473, 477, 172 R, DIG. 1; 156/230, 234, 235, 240, 249, 540, 541, 580, 581, 277, 384, 574, 385, 577, 387, 562, DIG. 27; 428/202, 204, 393, 352; 269/47, 49

[56] References Cited

U.S. PATENT DOCUMENTS

| | | | |
|---|---|---|---|
| 2,384,555 | 9/1945 | Kuhne | 33/450 |
| 2,763,241 | 9/1956 | Waggoner | 33/DIG. 1 |
| 2,822,736 | 2/1958 | Padgett | 33/184.5 |
| 2,910,776 | 11/1959 | Anderson | 33/450 |
| 3,393,456 | 6/1968 | Schrag | 33/467 |
| 4,380,874 | 4/1983 | Waldron | 156/234 |
| 4,598,453 | 7/1986 | Wills | 269/47 |

FOREIGN PATENT DOCUMENTS

| | | |
|---|---|---|
| 95360 | 11/1983 | European Pat. Off. . |
| 2007154 | 5/1979 | United Kingdom . |
| 2013566 | 8/1979 | United Kingdom . |
| 2013573 | 8/1979 | United Kingdom . |

*Primary Examiner*—Jerome Massie
*Assistant Examiner*—Louis Falasco
*Attorney, Agent, or Firm*—Darby & Darby

[57] ABSTRACT

A apparatus is described for producing optically satisfactorily laterally spaced letters which have been sequentially transferred from a dry transfer sheet. The sheet (28) is held in a holder (20) which incorporates a short free-motion linkage enabling the sheet so held to be moved horizontally over a short distance, the short distance being accurately repeated each time such movement is effected. By butting the letter next to be transferred to the letter just transferred and then moving the fixed distance away, visually pleasing letter spacing may be simply achieved without the use of extra transferable markings which need to be transferred to the working surface and subsequently removed, and without the need for excessively complex apparatus or for drawing alignment or spacing lines on the receptor.

6 Claims, 3 Drawing Figures

APPARATUS FOR USE IN SPACING LETTERS

Figure 1:
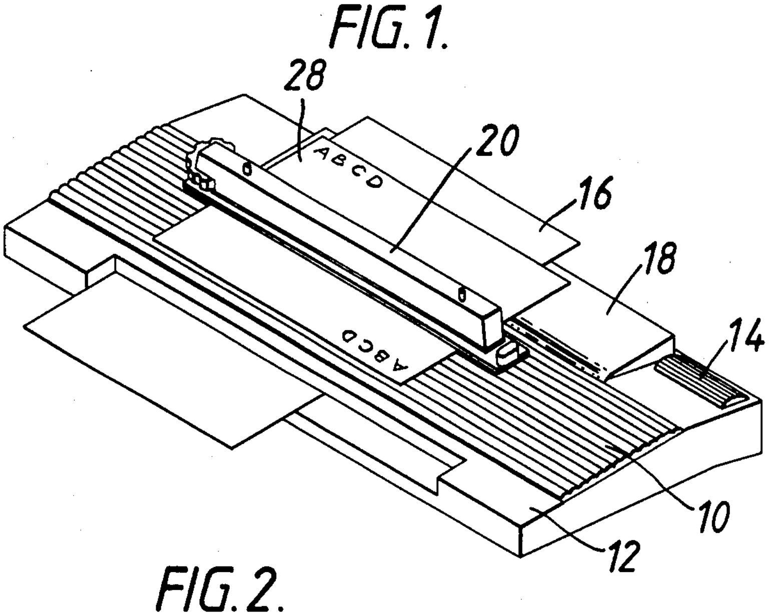

In the past two decades, very widespread use has been made of dry transfer lettering as an aid to the graphic artist. Such lettering generally consists of a flexible transparent or translucent carrier sheet having printed on it letters, numerals or other symbols (referred herein for simplicity generally as letters) each being overcoated with a layer of adhesive which can serve to adhere the ink letter to the desired receptor surface. Products of this type are described, for example, in British Patent Specifications Nos. 954,459 and 959,670.

In order to produce a legend, for example, a word or words, on a desired receptor surface using a dry transfer material, successive letters are sequentially transferred and the end result is to produce a word or set of words looking as though it had been printed directly on to the substrate. Although this effect is desired, it is often not achieved by the user due to the difficulty of securing accurate alignment and optically satisfactory spacing between the letters. Both are achieved automatically in conventional letterpress printing, and with sophisticated equipment such as photo-setting machinery. However, the investment required and difficulty of use of such apparatus restricts its application.

A classical approach to securing accurate vertical spacing is to draw, in soft light pencil, a straight base line on the surface of the receptor, position the sequential letters on it and then rub the base line out. This method is impractical when working on certain surfaces and there is always a danger that while rubbing out the base line, part of one or more letters will become dislodged or distorted, thus again ruining the desired effect. In recent years various types of apparatus have been developed to assist in securing accurately, horizontally aligned letters. For reference to the various types, attention is directed to published British Patent Applications Nos. 2,007,154, 2,013,566 and 2,013,573 and European Specifications Nos. 0005915, 0072677, 0080337, and 0095360.

While the apparatus there described permits the user simply to achieve a set of letters accurately horizontally aligned forming a word or words, the effect may still be marred by uneven letter spacing laterally.

British Patent Specification No. 1,073,065 describes one solution to the problem. The difficulty with the approach there described is that it requires the application of additional printed markings on the sheets which, if transferred, as is necessary if the spacing system is to be used, need subsequently to be removed from the receptor surface. This is inconvenient. In addition, the system described in specification No. 1,073,065 is inflexible in operation and does not always lead to optimum results.

Improved results may be obtained by operating a spacing system as described below in which the spacing is determined largely by a notional minimum distance between two adjacent letters, that minimum distance being the shortest horizontal spacing between adjacent parts of the letters at any height from the baseline on which the letters are aligned to their tops.

Using such an approach, a horizontally aligned laterally spaced word is created by the sequential transfer of successive letters from a dry transfer sheet by laying down the first letter on the desired receptor surface, positioning a second letter on a dry transfer material horizontally aligned with the first transferred letter and located such that the letters just touch but do not at any point overlap, moving the dry transfer sheet accurately horizontally by a predetermined distance, transferring the second letter and positioning and transferring the third and successive letters in similar fashion until the work is completed.

It will be seen that such an approach to letter spacing automatically takes care of "kerning". Kerning is the term used to describe the process by which two letters are placed closer to one another than would be possible were the letters each to be cast in cold metal type on their respective type pieces, in order that they look correctly spaced relative to one another. Kerning is particularly useful when letter shapes or letter forms would tend to fit into one another, for example the successive letters V, A, and W written in upper case Roman script need to be closer together than would be allowable with cast cold metal type in order for the optical appearance to be reasonable. Put in another way, kerning enables a vertical line to be drawn between the centres of two adjacent characters which intersects with both of them.

European Patent Specification No. 0072677 describes the method at page 3 line 7 to page 4 line 9 but gives few apparatus details, save to indicate some sort of mechanical button-actuated lateral movement.

We have now found that the method of spacing letters as explained above may be carried out conveniently by using a free movement "play" to effect spacing, e.g. by mounting the dry transfer sheet in a two-part holder, one part being movable relative to the other by the predetermined distance, with a free motion connection between them. Alternatively, the sheet may be mounted on a holder via a mounting having "play" in it corresponding to the predetermined distance.

In one example of such a system, there may be provided in the sheet a pair of mounting slots which engage over mounting pins on a holder bar. By moving the slots relative to the pins, a limited movement over the length of the slots in excess of the pin size may vary to match the size of the type printed on the dry transfer sheet, the larger the type size, the longer the slots, Thus, for typefaces with a point size range of 8 to 36 point (2 mm to 10 mm), the play between slot and pin may be correspondingly 0.5 mm to 1.0 mm, to give a normal looking spacing. If desired, play adjustment means may be incorporated both the enable a single bar unit to be used with differing type sizes, and to allow close, medium or wide spacing to be achieved using the same size typeface. Adjusting the amount of play (or choosing a bar with the appropriate amount) optimises letter spacing for a given size of lettering on the dry transfer sheet.

For the holder system, apparatus may be provided consisting of a base member adapted to support what constitutes a desired receptor surface on which a work is to be assembled, a dry transfer sheet holder, means engageable with the sheet holder to constrain the sheet holder to move in a horizontal direction precisely parallel to rows of letters on a sheet of dry transfer material mounted in the sheet holder, means for positioning the sheet holder at a given position, and a free motion linkage adapted to enable the sheet to move relative to the base member by a predetermined amount. Preferably, the apparatus includes means whereby the predetermined amount may be varied thus enabling the apparatus to be used with sheets of dry transfer material having letters printed thereon in small point sizes, medium point sizes or large point sizes. Naturally, the predetermined distance should be greater the larger the point size, though there is no hard and fast rule as to what the correct spacing for a given point size should be. Thus a given spacing gives a close setting with a large point size and a very broad setting with a very small point size.

Figure 2:
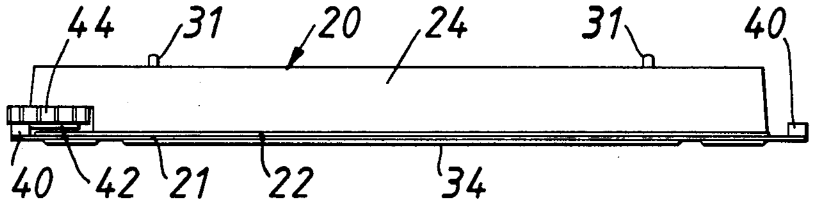
Figure 3:
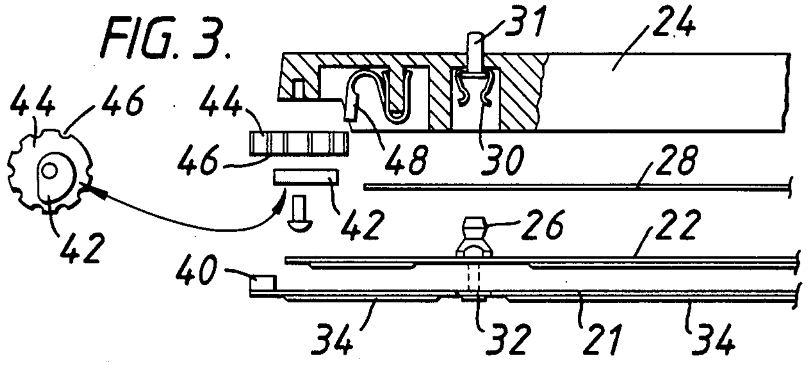

The invention is illustrated by way of example with reference to the accompanying drawings which show a simple apparatus for use in connection with a dry transfer sheet for applying words to sheets of paper with the letters forming the individual words accurately aligned and satisfactorily laterally spaced. In the drawings, FIG. 1 is a general perspective view of the apparatus, FIG. 2 is a side view of a transfer sheet holder constituting part of the apparatus of FIG. 1, and FIG. 3 is an exploded part-sectional view of one end of the transfer sheet holder on an enlarged scale.

Referring to FIG. 1 it is observed that the basic form of the apparatus is similar to the apparatus disclosed in published European Patent Application No. 0095360 the whole of the disclosures of which are incorporated herein by means of this reference. The various systems described in that application are designed to ensure accurate horizontal alignment of a set of sequentially transferred letters by the use of an evenly spaced parallel grooved magnetic member. Such a member is used in the apparatus of the present invention and is denoted 10. Magnetic member 10 is set on the upper face of a unit 12 which has a roller feed system 14 for feeding a sheet of paper 16 through the apparatus including a portion passing over a horizontal platen 18.

The apparatus comprises a transfer sheet holding bar 20 consisting of a lower ribbed magnetic bar 21, an upper bar 22 and a grippable member 24. Members 22 and 24 are fixed together via a pair of brass pins 26 fixed to bar 22 and which engage in clips 30 on the underside of bar 24. Loose ejector pins 31 are set in the top of sockets 30 to facilitate ejection of pins 26 therefrom when removing a sheet 28 from the holder 20. The pins 26 are shaped and dimensioned to register with correspondingly punched apertures in the middle of a dry transfer sheet 28, all as disclosed in the specification referred to above.

The lower member 21 is arranged to be slidable relative to member 22 by a small amount, the maximum amount of slide being determined by the length of slots 32 is member 21 through which passes the lower extremity of each of the brass pins 26. The lower bar 21 has a downwardly depending rib 34 which is adapted to engage in one of the set of accurately evenly spaced accurately parallel grooves in member 10 and, since member 21 is made of ferromagnetic material, to be held there fairly firmly.

Thus with the bar 20 magnetically held on to member 10, the assembly of transfer sheet and bars 22 and 24 can be moved laterally by a short distance dependent on the length of the slots 32.

The ease with which the bars 21 and 22 can slide relative to one another is greater than the ease with which the whole assembly of bars 21, 22 and 24 can be slid laterally along one of the grooves in the magnetic member 10.

It is accordingly possible to use the apparatus just described in a letter spacing system by inserting into the apparatus a sheet of paper on to which a legend is to be applied and applying the first letter of the legend from a dry transfer sheet held between bars 22 and 24.

Once the first letter has been transferred, the bar is moved to the right by grasping member 23 and then moved gradually to the left until the desired next letter, visible through the carrier sheet of the dry transfer material, comes to abut (but only just to abut) the letter just transferred. The member 24 is now moved to the right. and it, and the bar 22 with dry transfer sheet 28, execute a rightwards movement until the pin has reached the end of the slot 32 in bar 21. This end of the travel can be easily felt by the user. At the end of the travel, the two letters have moved apart by the fixed amount and the second letter can then be transferred similarly until the whole word is built up.

In accordance with a particularly preferred feature according to the present invention, the acutal distance which the dry transfer sheet and holder are moved to the right each time is slightly less than the maximum or considerably less that the maximum, the exact distance depending upon the amount of free play between the two members. This amount may be varied by the interaction of an upstanding abutment 40 on the lower member 21 with a horizontal cam 42 mounted on the upper member. Cam 42 is fixed to a positional adjustment wheel 44 which has around its circumference a set of notches 46 into each of which a spring 48 may engage to hold the wheel 44 in any one of nine angular positions. The cam 42 on the underside of the wheel 44 has an external surface in the form of a spiral having a single turn with its two ends being connected by a radial edge. Thus by turning the wheel 44, the amount of free play, and therefore the lateral spacing distance each time a letter is transferred, may be simply varied.

We claim:

1. In apparatus for providing a spaced legend on a receptor surface, the legend being built up from indicia sequentially transferred from a dry transfer sheet provided with horizontal lines of indicia, the apparatus including a support base adapted to support a receptor, and a holder cooperating with the support base for holding a dry transfer sheet, and enabling the sheet to be moved bodily in the plane of the sheet both along the lines of indicia and transverse thereto, the holder consisting essentially of a first portion to be held in fixed position relative to the support base, and a second portion including means for attaching said dry transfer sheet to said second portion and connected to said first portion by means enabling said first and second portions to be moved relative to one another in the direction of said longitudinal lines of indicia by a small distance amount, the improvement comprising connecting said first and second portions together via a lost motion connection whereby the dry transfer sheet held in said second portion can be freely moved horizontally in the direction of the lines of indicia relative to a receptor held supported on the base by said small distance amount.

2. The apparatus of claim 1 further comprising means for varying said small distance amount.

3. The apparatus of claim 1 wherein said dry transfer sheet holder comprises as first portion a bar engageable with the base, a second bar forming part of said second portion, a free motion connection between said first and second bars, said connector enabling the first bar to move longitudinally relative to the second bar by the small distance amount, and means on the second bar for affixing a dry transfer sheet thereto.

4. The apparatus of claim 3 wherein the bars include a cam and a stop, rotation of the cam varying the predetermined distance, one of the cam and the stop being mounted on the second bar and the other on the first bar.

5. The apparatus of claim 1 further comprising magnetic means for affixing the first portion of the holder to the base magnetically.

6. The apparatus of claim 5 wherein the magnetic means include a ferromagnetic holder, a rib on the holder, and a sheet of grooved permanently magnetic material forming part of the base and having a plurality of parallel grooves for reception of the rib.

* * * * *